United States Patent
Shoji et al.

(10) Patent No.: US 10,381,815 B2
(45) Date of Patent: Aug. 13, 2019

(54) BUSBAR MODULE

(71) Applicant: Yazaki Corporation, Tokyo (JP)

(72) Inventors: Takao Shoji, Shizuoka (JP); Shinichi Yanagihara, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 16 days.

(21) Appl. No.: 15/705,004

(22) Filed: Sep. 14, 2017

(65) Prior Publication Data
US 2018/0090920 A1    Mar. 29, 2018

(30) Foreign Application Priority Data

Sep. 26, 2016 (JP) ................. 2016-186818

(51) Int. Cl.
| | |
|---|---|
| *H01M 10/0525* | (2010.01) |
| *H02G 5/06* | (2006.01) |
| *H01M 2/20* | (2006.01) |
| *H01M 10/48* | (2006.01) |

(52) U.S. Cl.
CPC ............. *H02G 5/06* (2013.01); *H01M 2/206* (2013.01); *H01M 10/48* (2013.01); *H01M 10/482* (2013.01); *H01M 2220/20* (2013.01)

(58) Field of Classification Search
CPC ................ H01M 10/425; H01M 10/0525
See application file for complete search history.

(56) References Cited

U.S. PATENT DOCUMENTS

2005/0174092 A1*  8/2005  Dougherty .......... H01M 2/1077
                                                        320/128

FOREIGN PATENT DOCUMENTS

| JP | 2011-8957 A | 1/2011 |
| JP | 2011-49047 A | 3/2011 |
| JP | 2013-69491 A | 4/2013 |
| JP | 5648610 B2 | 1/2015 |

OTHER PUBLICATIONS

Japanese Office Action for the related Japanese Patent Application No. 2016-186818 dated Jan. 29, 2019.

* cited by examiner

*Primary Examiner* — Olatunji A Godo
(74) *Attorney, Agent, or Firm* — Kenealy Vaidya LLP (57) ABSTRACT

A busbar module includes a plurality of busbars that are connected to two or more electrode terminals in an electrode terminal group arranged in a row in a battery module including a plurality of battery cells, a housing case that has insulation property and includes a plurality of housing spaces that house the respective busbars, and a plurality of voltage detection conductors that are connected to the respective busbars. The voltage detection conductors are formed integrally with the housing case.

10 Claims, 5 Drawing Sheets

BUSBAR MODULE

CROSS-REFERENCE TO RELATED APPLICATION(S)

The present application claims priority to and incorporates by reference the entire contents of Japanese Patent Application No. 2016-186818 filed in Japan on Sep. 26, 2016.

BACKGROUND OF THE INVENTION

1. Field of the Invention

The present invention relates to a busbar module.

2. Description of the Related Art

Busbar modules are used for battery modules that include a plurality of battery cells connected in series. An example of the busbar modules includes a plurality of busbars connecting adjacent battery cells in series, a housing case housing the busbars, and voltage detection lines that are connected to the respective busbars (e.g., refer to Japanese Patent No. 5648610). For each voltage detection line, one end of the voltage line is connected to the busbar, while the other end of the voltage line is connected to an electronic control unit (ECU) mounted on a vehicle, for example, with a connector interposed therebetween. The voltage detection lines output voltage information about the battery cells to which the respective busbars are connected. The output voltage information is used for controlling charging of the battery module.

In such a busbar module, the voltage detection lines are routed to the housing case and connected to the respective corresponding busbars in assembly to assemble the busbar module to the battery module. The busbar module, thus, has a room for improving easiness in assembly work.

SUMMARY OF THE INVENTION

The invention is made in view of such a problem, and aims to provide a busbar module that can improve easiness in assembly work.

A busbar module according to one aspect of the present invention includes a plurality of busbars that are connected to two or more electrode terminals in an electrode terminal group arranged in a row in a battery module including a plurality of battery cells; a housing case that has insulation property and includes a plurality of housing spaces that house the respective busbars; and a plurality of voltage detection conductors that are connected to the respective busbars, wherein the voltage detection conductors are formed integrally with the housing case.

According to another aspect of the present invention, in the busbar module, it is preferable that the voltage detection conductors are printed circuit members attached to a surface of the housing case.

According to still another aspect of the present invention, in the busbar module, it is preferable that the voltage detection conductors are buried inside the housing case.

According to still another aspect of the present invention, in the busbar module, it is preferable that the housing case includes frame bodies forming the housing spaces and covers that plug the respective frame bodies, the frame bodies and the covers being paired with each other, the frame bodies and the covers are coupled with a hinge, and the voltage detection conductors are formed from the covers to the frame bodies via at least the hinge.

According to still another aspect of the present invention, in the busbar module, it is preferable that each of bottom portions forming the respective housing spaces has a connection hole, and each of the voltage detection conductors is in contact with the corresponding busbar, while one end of the voltage detection conductor is exposed in the connection hole.

According to still another aspect of the present invention, in the busbar module, it is preferable that each of the busbars has a connection projection that is to be inserted in the connection hole, and each of the voltage detection conductors is in contact with the connection projection, while one end of the voltage detection conductor is exposed in the connection hole.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes an embodiment according to the invention in detail with reference to the accompanying drawings. The embodiment does not limit the invention. The constituent elements of the following embodiment include elements that can be easily replaced by persons skilled in the art or that are substantially the same as the elements known by those in the art.

Embodiment

Figure 1:
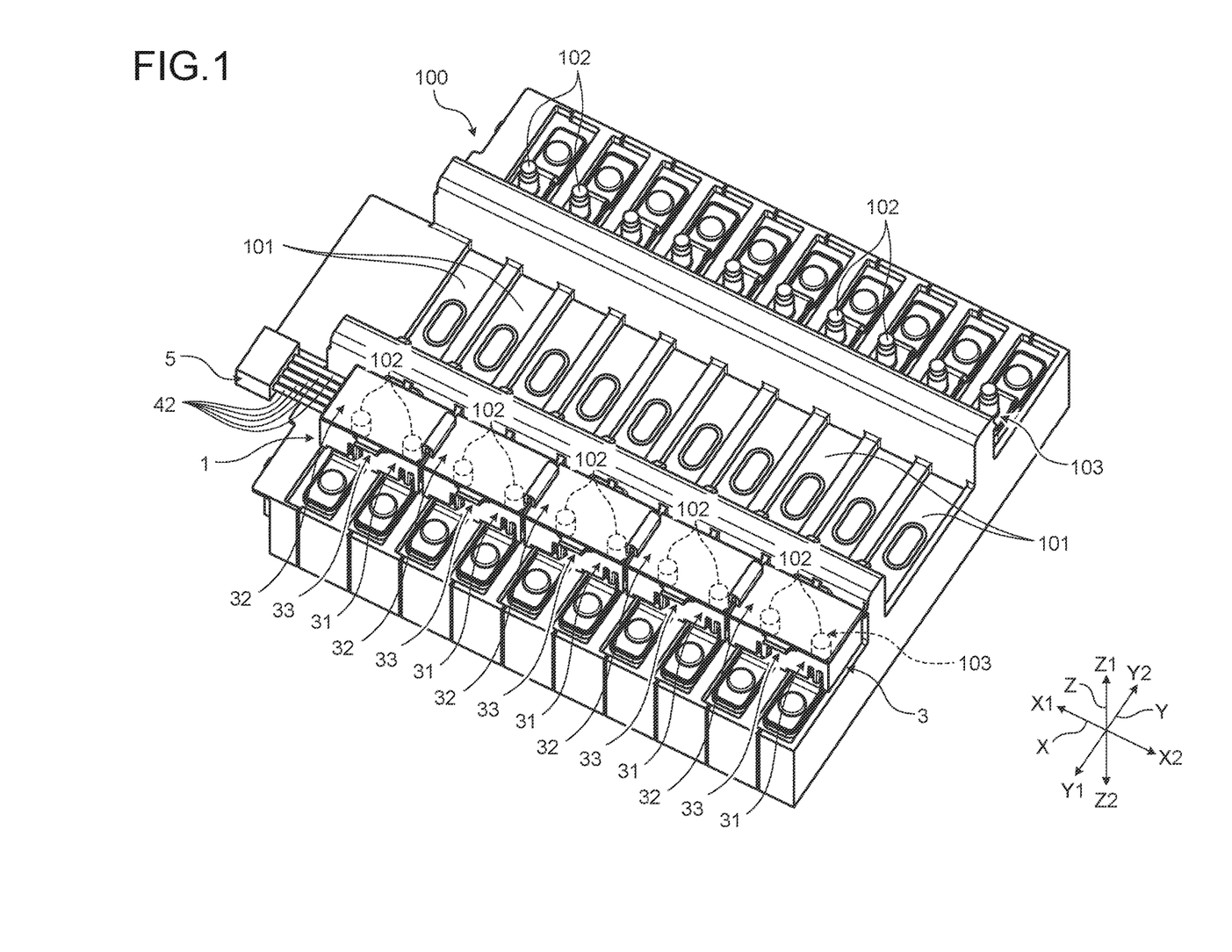
FIG. 1 is a perspective view of a battery module to which a busbar module according to an embodiment is assembled.
Figure 2:
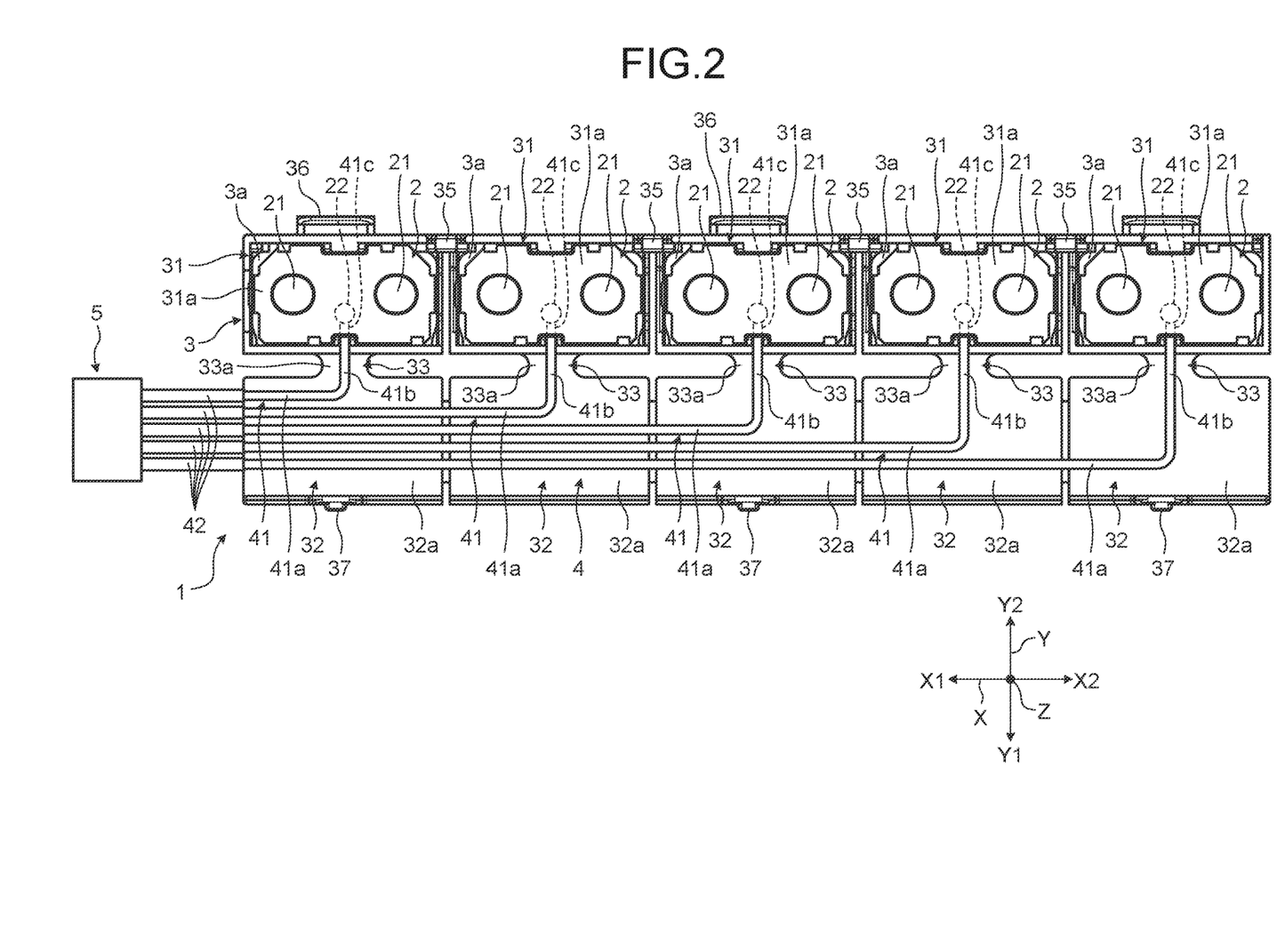
FIG. 2 is a plane view of the busbar module (in an open state) according to the embodiment.
Figure 3:
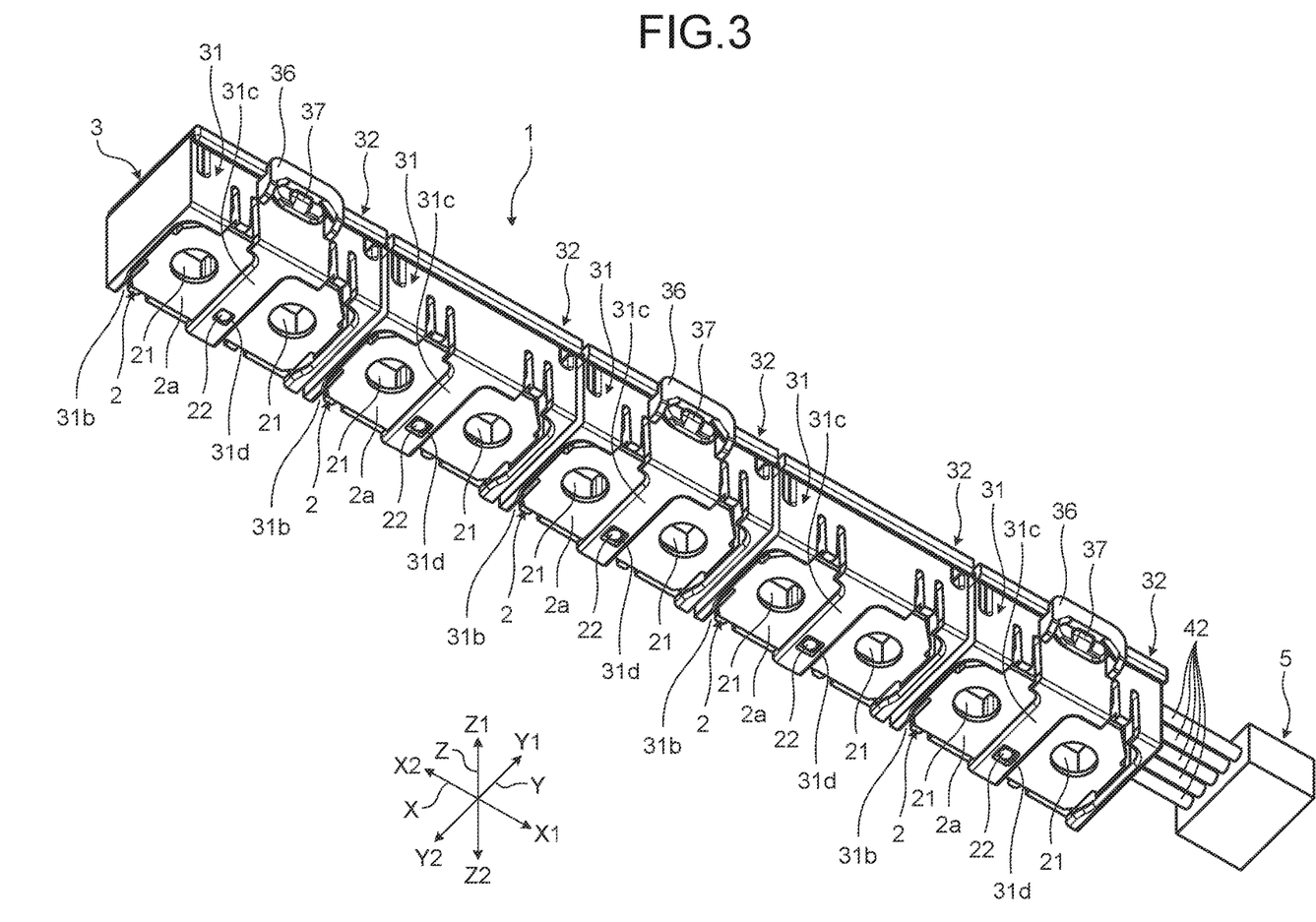
FIG. 3 is a perspective view of the busbar module according to the embodiment.
Figure 4:
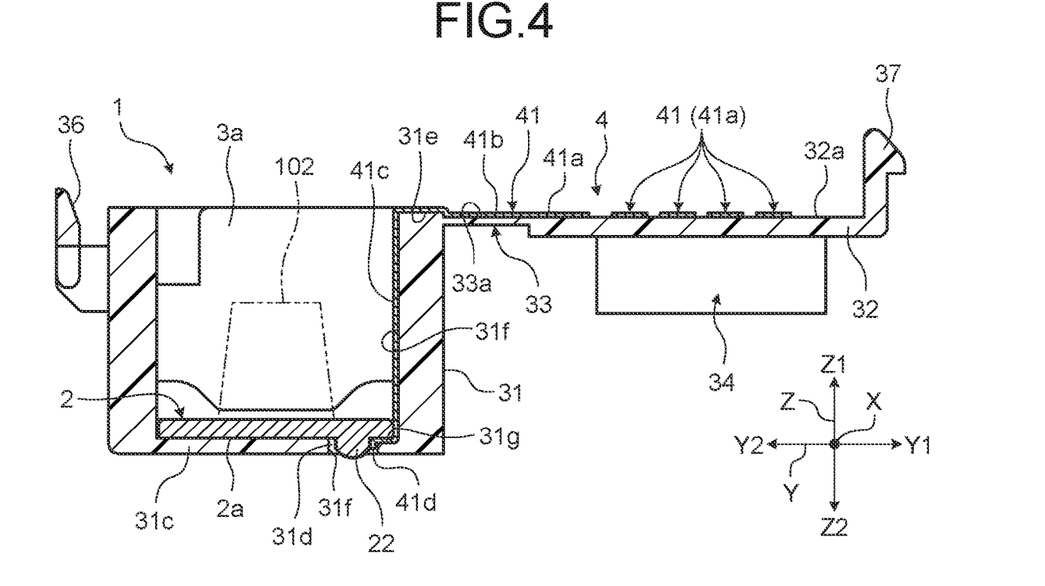
FIG. 4 is a cross-sectional view of the busbar module (in the open state) according to the embodiment.
Figure 5:
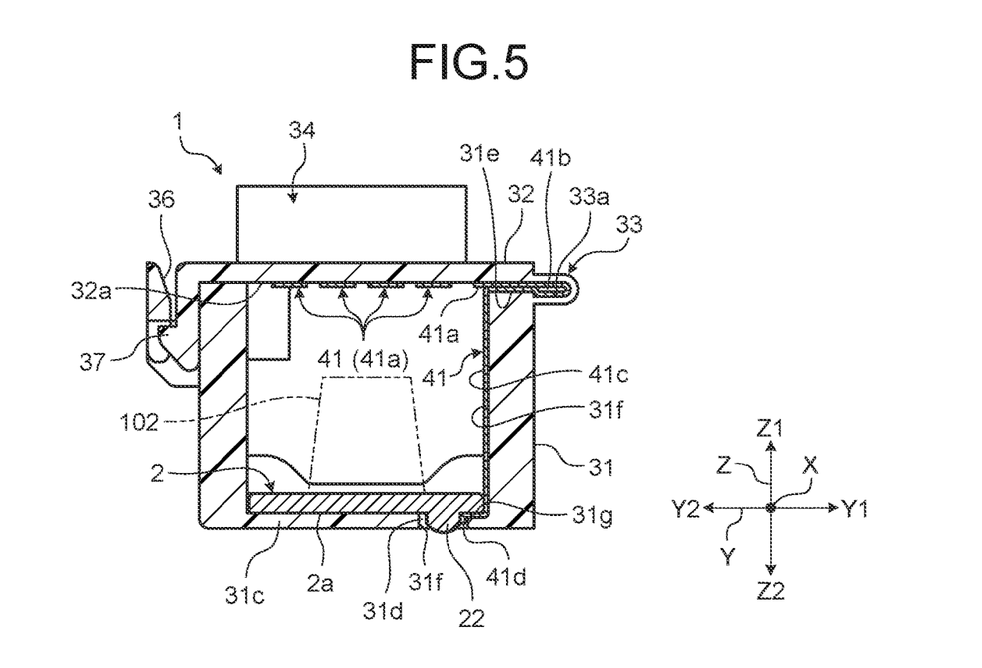
FIG. 5 is a cross-sectional view of the busbar module (in a close state) according to the embodiment.

FIG. 1 is a perspective view of a battery module to which a busbar module according to the embodiment is assembled. FIG. 2 is a plane view of the busbar module (in an open state) according to the embodiment. FIG. 3 is a perspective view of the busbar module according to the embodiment. FIG. 4 is a cross-sectional view of the busbar module (in the open state) according to the embodiment. FIG. 5 is a cross-sectional view of the busbar module (in a close state) according to the embodiment. FIG. 1 illustrates a state in which the busbar module is assembled to one electrode terminal group. FIGS. 1 and 5 illustrate the close states in which a cover is closed. FIGS. 2 and 4 illustrate the open states in which the cover is open. FIG. 4 is a cross-sectional view when the busbar module in the open state is viewed in an arrangement direction. FIG. 5 is a cross-sectional view when the busbar module in the close state is viewed in the arrangement direction. The X-direction in each figure is the arrangement direction of electrode terminals and busbars in the embodiment. The Y direction in each figure is a width direction of the busbar module in the embodiment and perpendicular to the arrangement direction. The Z direction in each figure is an up-down direction of the busbar module and perpendicular to the arrangement direction and the width direction. The X1 direction is a connector direction of the busbar module while the X2 direction is a non-connector direction, which is opposite to the connector direction, of the busbar module. The Y1 direction is a hinge direction of the busbar module while the Y2 direction is a non-hinge direction, which is opposite to the hinge direction, of the busbar module. The Z1 direction is an upper direction of the busbar module while the Z2 direction is a lower direction, which is opposite to the upper direction, of the busbar module.

As illustrated in FIG. 1, a busbar module 1 in the embodiment is assembled to a battery module 100. The battery module 100 includes a plurality of battery cells 101, such as secondary batteries, that are arranged in the arrangement direction and modularized, for example. The battery module 100 is mounted on an electric vehicle (EV) and a hybrid vehicle (HV) including a plug-in hybrid vehicle (PHV), for example. The battery module 100 is used for supplying power to a rotating electrical machine serving as a drive source and storing (charging) power generated by the rotating electrical machine. For example, a power source device can obtain a high battery output corresponding to an output required by a vehicle by connecting the multiple batteries in series. The battery cells 101 each have electrode terminals 102 (a positive pole terminal and a negative pole terminal) as a pair at both end portions in the width direction. The battery module 100 has electrode terminal groups 103 each of which is composed of the electrode terminals 102 arranged in the arrangement direction and that are formed in two rows apart from each other in the width direction. The busbar module 1 is assembled for each of the electrode terminal groups 103 included in the battery module 100. The electrode terminals 102 (the positive pole terminals and the negative pole terminals) of the battery cells 101 are connected in series or in parallel by the busbar modules 1. As a result, the battery module 100 fulfills a function as a desired power source. For example, the busbar module 1 allows the battery cells 101 to be connected in series when the battery module 100 obtains a high output corresponding to an output required by a vehicle (not illustrated) on which the battery module 100 is mounted.

The busbar module 1 is used for connecting the battery cells 101 in series or in parallel. The busbar module 1 includes a plurality of busbars 2, a housing case 3, a plurality of voltage detection conductors 41 forming a voltage detection conductor group 4, and a connector 5. The busbar module 1 externally outputs voltage information about the battery cells 101 connected to the respective busbars 2 through the voltage detection conductors 41. The voltage information is input to an electronic control unit (ECU), which is not illustrated, mounted on a vehicle via the connector 5. The ECU controls charging and discharging the battery module 100 on the basis of the acquired voltage information.

The busbar 2, which is connected to two or more electrode terminals 102 in the electrode terminal group 103 arranged in one row, is housed in the housing case 3. The busbar 2 in the embodiment electrically connects adjacent electrode terminals 102 on one side of the paired electrode terminals 102 of the adjacent battery cells 101 in the arrangement direction. The busbar 2 is made of a material having conductivity, such as metal, for example, and formed in a plate shape. As illustrated in FIGS. 2 to 5, the busbar 2 has a plurality of terminal holes 21 that correspond to respective electrode terminals 102 and formed along a longitudinal direction of the busbar 2. Into the terminal hole 21, the electrode terminal 102 projected upward from the battery cell 101 is inserted. The busbar 2 is fastened to the electrode terminal 102 with a fixture such as a nut, which is not illustrated. The busbar 2 has a connection projection 22 that projects in the lower direction and is formed on a rear surface 2a facing a bottom portion 31c of the housing case 3, in a busbar housed state in which the busbar 2 is housed in the housing case 3. The busbars 2, each of which is housed in a housing space 3a, which is described later, in the housing case 3, are arranged in such a manner that they are arranged in one row in the arrangement direction and the longitudinal direction of each busbar 2 is in parallel with the arrangement direction.

The housing case 3, which houses the respective busbars 2, has the housing spaces 3a formed corresponding to the respective busbars 2. The housing case 3 is formed of a synthetic resin, for example, and has insulation property. The housing case 3 includes frame bodies 31 and covers 32, which are paired with each other, first hinges 33, and third hinges 35.

The frame bodies 31 are arranged in the arrangement direction. In the embodiment, the number of frame bodies 31 is equal to that of busbars 2. The frame body 31 is formed along the outer periphery of the busbar 2 housed therein when viewed from the up-down direction. In the embodiment, the frame body 31 is formed in a rectangular parallelepiped shape extending in the up-down direction. The frame body 31 has an upper side opening 31a and a lower side opening 31b that are formed in the up-down direction, and the bottom portion 31c that partitions the lower side opening 31b in the arrangement direction. The bottom portion 31c is provided at the central area of the lower side opening 31b in the arrangement direction. Both end portions of the bottom portion 31c in the width direction are connected to the frame body 31. The bottom portion 31c is provided with a connection hole 31d into which the connection projection 22 is inserted in the busbar housed state. The frame body 31 has a locking hook formed on an inside wall forming the housing space 3a in such a manner that the locking hook projects on the housing space 3a side. The locking hook hinders the movement of the busbar 2 inserted into the housing space 3a in the up-down direction, resulting in the busbar 2 being held between the bottom portion 31c and the locking hook. The frame body 31 has a locking receiving portion 36 formed on a wall on which no second hinge 34 is formed of the walls facing each other in the width direction. Into the locking receiving portion 36, a locking hook 37, which is described later, is inserted. As a result, the locking hook 37 is locked to the locking receiving portion 36. In the embodiment, the locking receiving portion 36 is provided for every other frame body 31. The locking receiving portion 36 may be provided for each frame body 31.

The cover 32 plugs the housing space 3a. The cover 32 in the embodiment plugs the upper side opening 31a, thereby plugging the upper portion of the housing space 3a. The cover 32 is coupled to the frame body 31 paired with the cover 32 with the first hinge 33. The cover 32 has the locking hook 37 formed on one end portion on which no first hinge 33 is formed of the end portions facing each other in the width direction. In the embodiment, the locking hook 37 is provided for every other cover 32. The locking hook 37 may be provided for each cover 32.

The first hinge 33 has flexibility and a plate shape in a state in which no external force is applied to the first hinge 33. One end of the first hinge 33 in the width direction is connected to the frame body 31, while the other end of the first hinge 33 in the width direction is connected to the cover 32. The first hinge 33 allows the cover 32 to swing about the arrangement direction, i.e., to rotate toward the upper side opening 31a of the frame body 31. The first hinge 33 is formed integrally with the frame body 31 and the cover 32. The first hinge 33 in the embodiment is connected to one wall of the walls facing in the width direction of the frame body 31 at the central portion in the arrangement direction and at the upper side end portion of the wall, and is connected to one end portion of the ends facing in the width direction of the cover 32 and at the central portion of the end portion in the arrangement direction.

The second hinge 34 has flexibility and a U-shape when viewed from the width direction in a state in which no external force is applied to the second hinge 34. One end of the second hinge 34 is connected to one cover 32 of the covers 32 adjacent to each other in the arrangement direction, while the other end of the second hinge is connected to the other cover 32. The second hinge 34 allows one cover 32 of the covers 32 adjacent to each other to swing about the width direction with respect to the other cover 32. All of the covers 32 arranged in the arrangement direction are integrally formed. The second hinge 34 in the embodiment is connected to the ends facing each other in the arrangement direction of the covers 32 at the respective central portions of the ends in the width direction.

The third hinge 35 has flexibility and an inverted-U-shape when viewed from the width direction in a state in which no external force is applied to the third hinge 35. One end of the third hinge 35 is connected to one frame body 31 of the adjacent frame bodies 31 in the arrangement direction, while the other end of the third hinge 35 is connected to the other frame body 31. The third hinge 35 allows one frame body 31 of the adjacent frame bodies 31 to swing about the width direction with respect to the other frame body 31. All of the frame bodies 31 arranged in the arrangement direction are integrally formed. The third hinge 35 in the embodiment is connected to one wall and the other wall of the walls facing in the arrangement direction of the adjacent frame bodies 31 at the end portions of the walls on the non-hinge direction side in the width direction.

The voltage detection conductor group 4 is composed of the multiple voltage detection conductors 41. The voltage detection conductors 41 are connected to the respective busbars 2. In the embodiment, the voltage detection conductors 41 are arranged in the width direction and the number of voltage detection conductors 41 is equal to that of busbars 2. One end of the voltage detection conductor 41 in the embodiment is electrically connected to the busbar 2, while the other end of the voltage detection conductor 41 is electrically connected to an external electrical wire 42. The external electrical wires 42 are exposed outside the housing case 3. The external electrical wires 42 are arranged on a connector direction side of the cover 32 located on a side adjacent to the connector 5 out of the covers 32 arranged in the arrangement direction. The external electrical wire 42 in the embodiment has a structure different from that of the voltage detection conductor 41. For example, the external electrical wire 42 is composed of a conductor and an insulator covering the conductor. One end of the external electrical wire 42 is electrically connected to the voltage detection conductor 41, while the other end of the external electrical wire 42 is electrically connected to a terminal, which is not illustrated, held by the connector 5. The external electrical wires 42 may be a flexible flat cable (FFC) composed of conductors that correspond to the respective voltage detection conductors 41 and an insulator covering the conductors, or a flexible print circuit (FPC) composed of printed wiring lines that correspond to the respective voltage detection conductors 41 and a flexible circuit board on which the printed wiring lines are formed.

The voltage detection conductors 41 are formed integrally with the housing case 3. The voltage detection conductors 41 in the embodiment, which are printed circuit members, are formed integrally with the housing case 3 by being attached to a surface of the housing case 3. The voltage detection conductors 41 are made from a resin to which conductive metal particles are added, for example. The voltage detection conductors 41 are formed by being attached on the surface of the housing case 3 using a dispenser. The voltage detection conductors 41 in the embodiment are directly attached to the housing case 3. The voltage detection conductors 41 are formed by a drawing device including the dispenser and a stage corresponding to the dispenser. The dispenser ejects a raw material of the voltage detection conductors 41 filled therein to the housing case 3 to attach the raw material, i.e., the voltage detection conductors 41, to the surface of the housing case 3. The dispenser includes a filled unit that is filled with the raw material of the voltage detection conductors 41 and a nozzle that communicates with the filled unit and with the outside of the dispenser. The stage includes a fixing mechanism that fixes the housing case 3. The dispenser and the stage are connected to a control unit. To the control unit, mapping information about a circuit drawing corresponding to a shape of the voltage detection conductors 41 is set. The control unit causes the dispenser and the stage to move relatively to each other in accordance with the mapping information. The dispenser or the stage can be moved in three axial directions perpendicular to one another. When an operator operates the drawing device, the dispenser ejects the raw material filled therein to the surface of the housing case 3 from the tip of the nozzle. At the same time, the dispenser or the stage is moved in accordance with the mapping information set to the control unit. As a result, the voltage detection conductors 41 are attached to the surface of the housing case 3.

Each of the voltage detection conductors 41 is partitioned into a cover region 41a, a first hinge region 41b, a frame body region 41c, and a connection hole region 41d. The voltage detection conductor 41 in the cover region 41a is formed on a rear surface 32a of the cover 32. The voltage detection conductor 41 in the cover region 41a is formed by being extended in the arrangement direction from the end on the connector direction side of the cover 32 located on a side adjacent to the connector out of the covers 32 arranged in the arrangement direction. Each of the voltage detection conductors 41 in the cover region 41a is formed by being extended to the corresponding cover 32 paired with the frame body 31 housing the busbar 2 to which the voltage detection conductor 41 is connected. One end of the voltage detection conductor 41 in the first hinge region 41b is connected to the corresponding external electrical wire 42, while the other end of the voltage detection conductor 41 is connected to the voltage detection conductor 41. Among the voltage detection conductors 41 in the cover region 41a, the voltage detection conductors 41 crossing between the covers 32 in the arrangement direction are each also formed on a rear surface of the second hinge 34 between the covers 32 across both ends in the arrangement direction of the second hinge 34. The voltage detection conductor 41 in the first hinge region 41b is formed on a rear surface 33a of the first hinge 33. The voltage detection conductor 41 in the first hinge region 41b is formed across both ends in the width direction of the first hinge 33. One end of the voltage detection conductor 41 in the first hinge region 41b is connected to the voltage detection conductor 41 in the cover region 41a, while the other end of the voltage detection conductor 41 in the first hinge region 41b is connected to the voltage detection conductor 41 in the frame body region 41c. Each of the voltage detection conductors 41 is, thus, formed from the cover 32 to the corresponding frame body 31 with the first hinge 33 interposed therebetween. The voltage detection conductor 41 in the frame body region 41c is continuously formed from an upper surface 31e to an inner circumferential surface 31f to an upper surface 31g of the bottom portion of the frame body 31. The voltage detection conductor 41 in the frame body region 41c is formed across both ends in the width direction of the upper surface 31e, across both ends in the up-down direction of the inner circumferential surface 31f, and from the other end in the up-down direction of the inner circumferential surface 31f to the connection hole 31d on the upper surface 31g of the bottom portion in the width direction. One end of the voltage detection conductor 41 in the frame body region 41c is connected to the voltage detection conductor 41 in the first hinge region 41b, while the other end of the voltage detection conductor 41 in the frame body region 41c is connected to the voltage detection conductor 41 in the connection hole region 41d. The voltage detection conductor 41 in the connection hole region 41d is formed on the inner circumferential surface 31f forming the connection hole 31d. The voltage detection conductor 41 in the connection hole region 41d is formed on the inner circumferential surface 31f along the up-down direction. The end on the upper direction side of the voltage detection conductor 41 in the connection hole region 41d is connected to the voltage detection conductor 41 in the frame body region 41c, while the end on the lower direction side of the voltage detection conductor 41 in the connection hole region 41d is connected to the connection projection 22. In other words, each of the voltage detection conductors 41 is in contact with the corresponding connection projection 22, while one end of the voltage detection conductor 41 is exposed in the corresponding connection hole 31d. Each voltage detection conductor 41 can reduce a portion externally exposed in a state in which the cover 32 covers the frame body 31. This structure can reduce damage due to external force or shock, thereby making it possible to increase durability.

The following describes assembly of the busbar module 1. The respective voltage detection conductors 41 are preliminarily formed on the housing case 3 as printed circuit members. The other ends of the respective voltage detection conductors 41 are preliminarily connected to the connector 5 via the corresponding external electrical wires 42. An operator houses the busbars 2 into the respective housing spaces 3a in the housing case 3. In the busbar housed state, the busbar 2 is held in the housing space 3a by the busbar locking hook, and the connection projection 22 is inserted into the connection hole 31d, thereby facing the end on the lower direction side of the voltage detection conductor 41 in the connection hole region 41d. The operator, then, connects the busbars 2 to the respective voltage detection conductors 41. The operator electrically connects the busbar 2 and the voltage detection conductor 41 that are disposed in the same housing space 3a using an electrical connection technique such as laser welding or soldering, for example. The operator, then, assembles the busbar module 1 to the battery module 100 in a state in which the covers 32 are open (in the open state). As a result, each electrode 102 of the electrode terminal group 103 is inserted into the terminal hole 21 of the corresponding busbar 2, as illustrated in FIG. 4. The operator, then, fastens the busbars 2 to the electrode terminals 102 using fixtures. The operator, then, closes the covers 32 (sets the state to be in the close state) as illustrated in FIG. 5. Specifically, the operator swings the covers 32 about the arrangement direction such that each cover 32 plugs the upper side opening 31a of the frame body 31 paired to the cover 32, and the locking hook 37 is inserted into the locking receiving portion 36 so as to be locked with the locking receiving portion 36. As a result, the covers 32 are kept closed.

As described above, in the busbar module 1, the voltage detection conductors 41 are preliminarily formed, as the printed circuit members, integrally with the housing case 3. It is, thus, unnecessary to route the voltage detection conductors 41 on the housing case 3 in assembly of the busbar module 1, thereby making it possible to improve easiness in assembly work. When the busbar module 1 is assembled to the battery module 100, no time is required to route the voltage detection conductors 41 on the housing case 3, thereby making it possible to reduce time for assembling the busbar module 1 to the battery module 100.

The voltage detection conductors 41, which are the printed circuit members, can be formed on the surface of the housing case 3 without any limitation. The voltage detection conductors 41, thus, can be routed to a place for which it is difficult to route the voltage detection conductors 41 due to the limitation of the structure of the housing case 3. As a result, it is possible to reduce the limitation in shape of the busbar module 1 due to the routing of the voltage detection conductors 41.

Each voltage detection conductor 41 is coupled to the connector 5 via the cover 32 or the covers 32. The cover 32 has a plate shape for plugging the housing space 3a, thereby allowing the voltage detection conductors 41 to be easily formed thereon.

One end of the voltage detection conductor 41 is exposed in the connection hole 31d. The one end of the voltage detection conductor 41 faces the connection projection 22 inserted into the connection hole 31d when the busbar 2 is housed in the housing space 3a. This structure makes it possible to align the busbar 2 with the one end of the voltage detection conductor 41, thereby making it possible to easily connect the busbar 2 to the voltage detection conductor 41.

In the embodiment, the respective voltage detection conductors 41 may be formed on a recessed portion that is formed on the surface of the housing case 3 and projects toward the inside of the housing case 3. This case makes it possible to prevent the voltage detection conductors 41 serving as the printed circuit members from projecting from the surface of the housing case 3, and to prevent the voltage detection conductors 41 from being damaged by external force or shock, thereby making it possible to improve durability.

In the embodiment, the voltage detection conductors 41 are formed using the dispenser. The voltage detection conductors 41 are, however, not limited to being formed using the dispenser. For example, the voltage detection conductors 41 may be formed by printing, vapor deposition, or as a molded interconnect device (MID).

Figure 6:
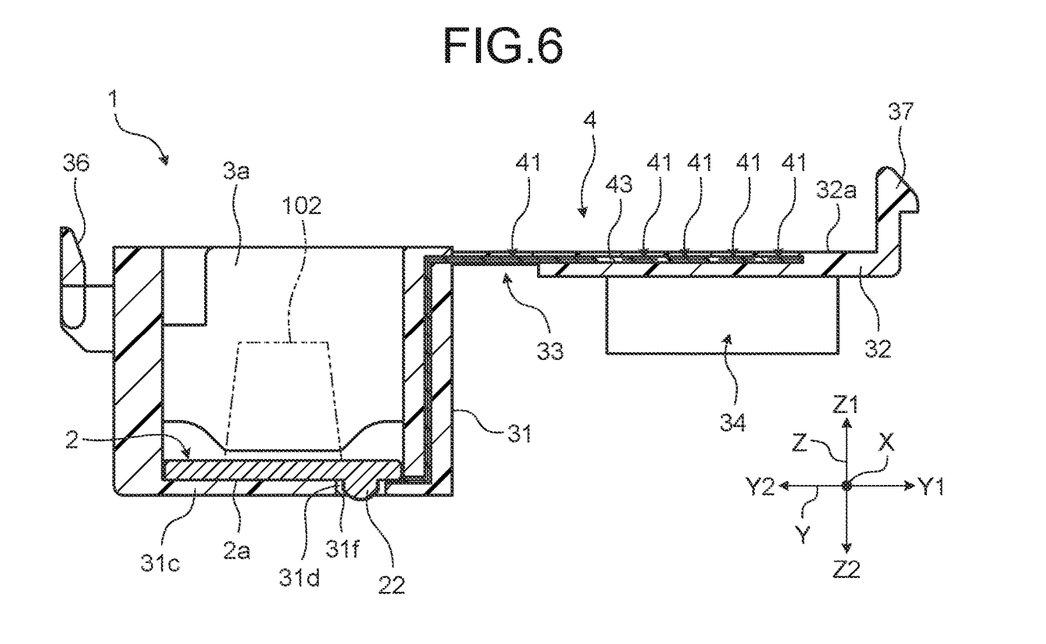
FIG. 6 is a cross-sectional view of a modification of the busbar module (in the open state) according to the embodiment.

In the embodiment, the voltage detection conductors 41 are formed as the printed circuit members. The voltage detection conductors 41 are not limited to be formed as the printed circuit members. The voltage detection conductors 41 may be provided by being buried in the housing case 3. FIG. 6 is a cross-sectional view of a modification of the busbar module (in the open state) according to the embodiment. For example, as illustrated in FIG. 6, the voltage detection conductor group 4 composed of the multiple voltage detection conductors 41 may be formed as a single flexible flat cable, and the flexible flat cable may be buried in the housing case 3. Each of the voltage detection conductors 41 is a strip-shaped flexible conductor having a rectangular section. All of the voltage detection conductors 41 are coated with a flexible insulator 43 formed from a synthetic resin, for example. As a result, a strip-shaped flexible flat cable having a rectangular section is formed. The insulator 43 may be a material identical or different from the material of the housing case 3 as long as the material has insulation property. The voltage detection conductor group 4 is buried in the housing case 3 by known methods. For example, the voltage detection conductor group 4 is buried in the housing case 3 by insert molding. Specifically, the voltage detection conductor group 4 formed as the flexible flat cable is preliminarily set in a mold. The housing case 3 is formed using the mould, thereby making it possible to form the housing case 3 and to bury the voltage detection conductors 41 in the housing case 3. This structure requires no routing of the voltage detection conductors 41 to the housing case 3, thereby making it possible to improve easiness in assembly work. As a result, a time for assembling the busbar module 1 to the battery module 100 can be reduced.

The voltage detection conductor group 4 may be formed as a single flexible printed board. In this case, the respective voltage detection conductors 41 are formed on a flexible board as printed wiring, and the flexible board is coated with a protection layer so as to cover the printed wiring. As a result, the voltage detection conductor group 4 is achieved. Each of the voltage detection conductors 41 may be formed as a flexible flat cable or a flexible printed board. The voltage detection conductor group 4 may be formed as a collective body of a plurality of flexible flat cables or flexible printed boards that correspond to the respective voltage detection conductors 41. The voltage detection conductors 41 may be directly buried in the housing case 3.

In the embodiment, the voltage detection conductor 41 is connected to the connection projection 22. The voltage detection conductor 41 is not limited to be connected to the connection projection 22. The voltage detection conductor 41 may be directly connected to the rear surface 2a of the busbar 2. In this case, one end of the voltage detection conductor 41 is exposed in the connection hole 31d. The one end and a part exposed from the connection hole 31d of the rear surface 2a of the busbar 2 are electrically connected by a connection member having conductivity such as a conductive paste or solder, for example.

The busbar module according to the present embodiment includes the multiple voltage detection conductors formed integrally with the housing case, thereby requiring no routing of the voltage detection conductors to the housing case. The present embodiment, thus, has an advantageous effect of being capable of improving easiness in assembly work.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. A busbar module, comprising:
a plurality of busbars that are connected to two or more electrode terminals in an electrode terminal group arranged in a row in a battery module including a plurality of battery cells;
a housing case that has insulation property and includes a plurality of housing spaces that house the respective busbars; and
a plurality of voltage detection conductors that are electrically connected to the respective busbars, wherein
the voltage detection conductors are formed integrally with the housing case, and
the voltage detection conductors are buried inside the housing case.
2. The busbar module according to claim 1, wherein
the voltage detection conductors are printed circuit members attached to a surface of the housing case.
3. The busbar module according to claim 1, wherein
the housing case includes frame bodies forming the housing spaces and covers that plug the respective frame bodies, the frame bodies and the covers being paired with each other,
the frame bodies and the covers are coupled with a hinge, and
the voltage detection conductors are formed from the covers to the frame bodies via at least the hinge.
4. The busbar module according to claim 2, wherein
the housing case includes frame bodies forming the housing spaces and covers that plug the respective frame bodies, the frame bodies and the covers being paired with each other,
the frame bodies and the covers are coupled with a hinge, and
the voltage detection conductors are formed from the covers to the frame bodies via at least the hinge.
5. The busbar module according to claim 1, wherein
each of bottom portions forming the respective housing spaces has a connection hole, and
each of the voltage detection conductors is in contact with the corresponding busbar, while one end of the voltage detection conductor is exposed in the connection hole.
6. The busbar module according to claim 2, wherein
each of bottom portions forming the respective housing spaces has a connection hole, and
each of the voltage detection conductors is in contact with the corresponding busbar, while one end of the voltage detection conductor is exposed in the connection hole.
7. The busbar module according to claim 3, wherein
each of bottom portions forming the respective housing spaces has a connection hole, and
each of the voltage detection conductors is in contact with the corresponding busbar, while one end of the voltage detection conductor is exposed in the connection hole.
8. The busbar module according to claim 5, wherein
each of the busbars has a connection projection that is to be inserted in the connection hole, and
each of the voltage detection conductors is in contact with the connection projection, while one end of the voltage detection conductor is exposed in the connection hole.
9. The busbar module according to claim 6, wherein
each of the busbars has a connection projection that is to be inserted in the connection hole, and
each of the voltage detection conductors is in contact with the connection projection, while one end of the voltage detection conductor is exposed in the connection hole.

10. The busbar module according to claim 7, wherein
each of the busbars has a connection projection that is to be inserted in the connection hole, and
each of the voltage detection conductors is in contact with the connection projection, while one end of the voltage detection conductor is exposed in the connection hole.

\* \* \* \* \*